United States Patent
Venkatasubramanian et al.

(10) Patent No.: US 10,387,186 B2
(45) Date of Patent: Aug. 20, 2019

(54) HYPERVISOR WITH VIRTUAL-MEMORY FILE SYSTEM

(71) Applicant: VMware, Inc., Palo Alto, CA (US)

(72) Inventors: Rajesh Venkatasubramanian, San Jose, CA (US); Kiran Tati, Santa Clara, CA (US); Syed Zahed Khurasani, Bellevue, WA (US); Ashish Kaila, Cupertino, CA (US); Mukund Gunti, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/636,527

(22) Filed: Jun. 28, 2017

(65) Prior Publication Data

US 2019/0004838 A1 Jan. 3, 2019

(51) Int. Cl.
*G06F 9/44* (2018.01)
*G06F 9/455* (2018.01)
*G06F 9/4401* (2018.01)
*G06F 3/06* (2006.01)
*G06F 12/08* (2016.01)

(52) U.S. Cl.
CPC .......... *G06F 9/45558* (2013.01); *G06F 3/065* (2013.01); *G06F 3/067* (2013.01); *G06F 3/0619* (2013.01); *G06F 9/4401* (2013.01); *G06F 12/08* (2013.01); *G06F 2009/45562* (2013.01); *G06F 2009/45583* (2013.01)

(58) Field of Classification Search
USPC .......................................................... 711/6
See application file for complete search history.

(56) References Cited

U.S. PATENT DOCUMENTS

| | | | |
|---|---|---|---|
| 6,961,941 B1 | 11/2005 | Nelson et al. | |
| 7,017,018 B1 | 3/2006 | Beckett et al. | |
| 7,219,206 B1 | 5/2007 | McPolin | |
| 7,636,800 B2* | 12/2009 | Ben-Yehuda | G06F 12/1081 710/22 |
| 7,814,495 B1 | 10/2010 | Lim et al. | |
| 7,818,726 B2 | 10/2010 | Apparvoo et al. | |
| 8,181,007 B2 | 5/2012 | Liu | |
| 9,135,038 B1* | 9/2015 | Uchronski | G06F 9/45533 |
| 2006/0242442 A1 | 10/2006 | Armstrong et al. | |
| 2007/0016755 A1* | 1/2007 | Pratt | G06F 12/1009 711/207 |

(Continued)

OTHER PUBLICATIONS

"Tmpfs". Wikipedia, downloaded from https://en.wikipedia.org/wiki/Tmpfs.

*Primary Examiner* — Shawn X Gu
*Assistant Examiner* — Jean C Edouard
(74) *Attorney, Agent, or Firm* — Clifton Leon Anderson (57) ABSTRACT

A first hypervisor uses a first version of a virtual-memory file system (VMemFS) suspends virtual machines. A second hypervisor uses a instance of the VMemFS, the version of which may be the same or different from the first version. The VMemFS is designed so that an instance of the same or a later version of the VMemFS can read and ingest information in memory written to memory by another instance of the VMemFS. Accordingly, the second hypervisor resumes the virtual machines, effecting an update or other swap of hypervisors with minimal interruption. In other examples, the swapped hypervisors support process containers or simply support virtual memory.

24 Claims, 5 Drawing Sheets

(56) References Cited

U.S. PATENT DOCUMENTS

| | | | |
|---|---|---|---|
| 2008/0184373 A1 | 7/2008 | Traut et al. | |
| 2010/0095045 A1* | 4/2010 | Lambeth | G06F 9/45558 711/6 |
| 2010/0125845 A1 | 5/2010 | Sugumar et al. | |
| 2010/0235831 A1* | 9/2010 | Dittmer | G06F 9/45558 718/1 |
| 2010/0281273 A1* | 11/2010 | Lee | G06F 21/72 713/190 |
| 2011/0066786 A1* | 3/2011 | Colbert | G06F 9/45558 711/6 |
| 2011/0119670 A1* | 5/2011 | Sugumar | G06F 9/5088 718/1 |
| 2011/0265083 A1* | 10/2011 | Davis | G06F 12/0866 718/1 |
| 2011/0320681 A1* | 12/2011 | Borntraeger | G06F 12/109 711/6 |
| 2012/0017031 A1 | 1/2012 | Mashtizadeh et al. | |
| 2012/0158803 A1 | 6/2012 | Kandasamy et al. | |
| 2012/0265959 A1* | 10/2012 | Le | G06F 17/30067 711/162 |
| 2013/0047160 A1* | 2/2013 | Conover | G06F 8/65 718/1 |
| 2013/0263118 A1 | 10/2013 | Kannan et al. | |
| 2014/0019968 A1 | 1/2014 | Deng et al. | |
| 2014/0149634 A1* | 5/2014 | Tosatti | G06F 9/45558 711/6 |
| 2014/0149635 A1 | 5/2014 | Bacher et al. | |
| 2014/0282539 A1 | 9/2014 | Sonnek | |
| 2015/0169329 A1 | 6/2015 | Barrat et al. | |
| 2015/0324227 A1 | 11/2015 | Sizemore | |
| 2016/0026489 A1 | 1/2016 | Maislos et al. | |

\* cited by examiner

FIG. 6 ns to be an important objec-
HYPERVISOR WITH VIRTUAL-MEMORY FILE SYSTEM

BACKGROUND

Hypervisors can be updated several times a year to provide new features and to address bugs, compatibility issues, and emergent security issues. To effect the update, a hypervisor can be used to update its own disk image; rebooting then results in the update. During this procedure, applications hosted by the hypervisor may have to be checkpointed (e.g., suspended and copied to disk) and restarted; the resulting interruption of the applications may be at best undesirable and, in many cases, may be unacceptable. The need to restart applications can be avoided by migrating them (and their respective virtual machines and/or containers) to other hardware-plus-hypervisor systems; however, the resulting network bandwidth consumption and inevitable performance hits can be unacceptable. So, minimizing interruptions and performance penalties associated with hypervisor updates continues to be an important objective.

DETAILED DESCRIPTION

In accordance with the present invention, a hypervisor can establish and use a virtual-memory file system (VMemFS) to transfer data to another (potentially newer version of the) hypervisor on the same machine. The data can be pointers to the main memory of source hypervisor, hence no need to copy the data which can be used to hand-off virtual machines efficiently. Thus for example, the VMemFS provides for hypervisor updates that at most minimally interrupt the virtual-machine operation.

Herein, a "file system" is a protocol for storing information to and retrieving information from storage media. Various file systems have been developed for various media types, including hard disks, optical disks, and magnetic tape. For example, NTFS (New Technology File System) is a hard-disk file system that was introduced by International Business Machines as part of the Windows NT operating system in 1993. Although designed for hard disks, NTFS is used with other media types (e.g., volatile and non-volatile memory) formatted as hard disks. Over the years, more advanced versions of NTFS have been introduced. As is implicit in the notion of a file system, newer versions are at least backwardly compatible with older versions so that information stored using one version of the file system can be accessed by other instances of the same version and by later versions of the same file system.

VMemFS is a file system for virtual memory in much the same way that NTFS is a file system for disk media. However, since the target media is virtual, its physical representations in machine memory and the mappings between virtual memory and machine memory are both stored by the VMemFS.

The hypervisors of interest herein tend to be updated much more frequently than the file systems they include. When a hypervisor is updated, the new version can contain any intelligence required for translating between versions. For example, a new version may introduce a new or revised data format and provide conversion facilities to handle updates and rollbacks. When VMemFS is updated, the updated version of VMemFS can include any intelligence required to understand the content written by the previous version of itself. Alternatively, the new hypervisor version can include the conversion facilities for translating between the old and new versions of the VMemFS.

Figure 1:
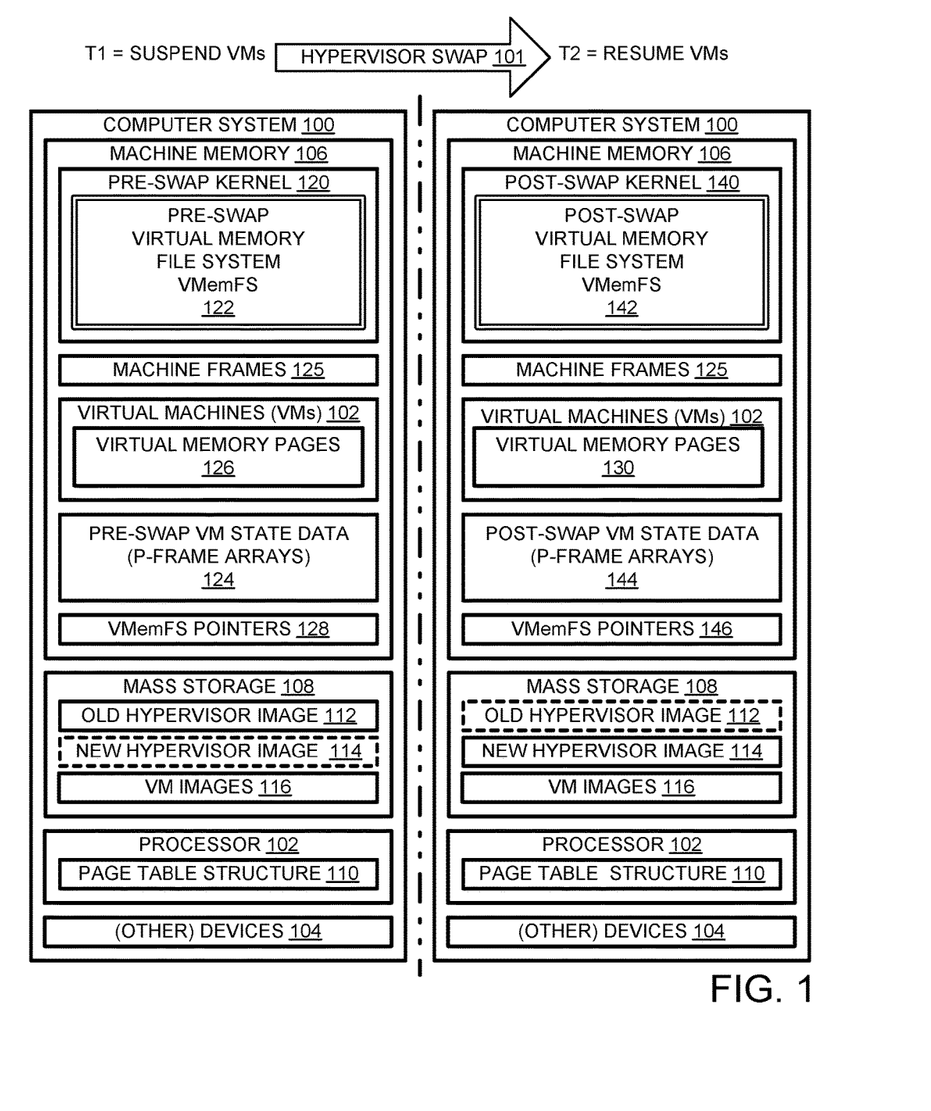
FIG. 1 is a schematic diagram of a computer system, shown at a suspend time T1 and at a resume time T2, having a hypervisor with a virtual-memory file system and virtual machines.

For example, in FIG. 1, a computer system 100 is shown at two different times during a hypervisor swap 101: a time T1 at which a suspend procedure is performed, and a later time T2 at which a resume procedure is performed. In the interim, a "post-swap" hypervisor is swapped in for a "pre-swap" hypervisor. During the swap, the virtual-memory contents of the virtual machines remains represented in memory so as to achieve a very short duration between suspend and resume procedures, thus minimally interrupting virtual-machine operations.

Hardware for computer system 100 includes a processor 102, other devices 104 including communications devices, and non-transitory media including machine (physical) memory 106 and mass storage 108. Processor 102, which can include one or more x86 processors (available from Intel Corp.) or Arm processors (available from Arm, Ltd.) includes a memory-management unit having a multi-level page table structure 110. This hardware page table permits rapid virtual-machine memory address translations.

Mass storage 108 is encoded with code representing an "old" (aka "pre-swap") hypervisor disk image 112, a "new" hypervisor disk image 114, and virtual-machine images 116, which are respective disk images for virtual machines 102. Machine memory 106 is encoded with code representing the active hypervisor kernel 120, which at time T1 is the kernel corresponding to old hypervisor image 112. At time T1, the new hypervisor represented by new hypervisor image 114 is inactive, so there is no corresponding post-swap kernel at time T1.

Pre-swap kernel 120 includes and employs a corresponding pre-swap virtual memory file system VMemFS 122. Kernel 120 tracks the states of the hardware of the virtual machines: virtual processor states such as register contents and page table entries, virtual device states such as network addresses for network-interface cards (NICs), memory states, and virtual-memory states including page-frame mappings and other per-page states (e.g., "dirty" versus "clean". VMemFS 122 is then used to store descriptions of these hardware states.

VMemFS 122 stores data representing the locations, content, and format of the pre-swap virtual-machine device state data 124, the number and locations of machine frames 125, the assignments of virtual-memory pages 126 to virtual machines 102, the mappings of pages 126 to frames 124 and the locations of these mappings. The names and locations of the files for the various types of state data can be stored in a VMemFS virtualization directory 128. Directory 128 may be stored in a default location or in a location referenced by a pointer stored in a default location.

Instead of copying entire guest memory, only the data structures that manage the guest memory are copied. In some embodiments, these data structures are stored by VMemFS initially so that they do not have to be copied at suspend time. VMemFS 122 stores directory of VMs and for each VM it stores the checkpoint state with special handling for guest memory.

In some embodiments, the VMemFS is only used to implement a hypervisor update or other swap. A system that is not standardized is used instead during normal operation. In such cases, the VMemFS may, in preparation for a swap, translate some virtual-machine state data to a format that can be ingested by another instance of the VMemFS. In the illustrated embodiment, VMemFS 122 is used full time, during normal operation and for hypervisor updates. An advantage of the full-time use is that no translation is required to prepare for the swap, which can thus proceed more quickly and directly.

Note that the format of the VMemFS is distinct from the format of the data stored by VMemFS The hypervisor kernel stores information into VMemFS and version/format of the data stored in the VMemFS has major impact on whether hypervisor kernel needs to convert or not. In other words the format of data stored in VMemFS by pre swap kernel is fixed and known to post swap kernel. The same data format in post format kernel is same or upgraded, in both cases, it knows how to deal with it.

Once it has suspended virtual machines 102, the pre-swap kernel can trigger a boot of the post-swap hypervisor using new hypervisor image 114. This results in a post-swap kernel 140 with a post-swap virtual-memory file system VMemFS 142. If post-swap VMemFS 142 is the same version as the pre-swap VMemFS 122, then post-swap virtual-machine state data 144 can match the pre-swap virtual machine state data 124; likewise the post-swap VMemFS pointers 146 can match pre-swap VMemFS pointers 128.

In general, file systems provide a way to create/read/write/delete files/objects. Usually file systems do not interpret the data the user is storing into them. For example, NTFS, does not know what is being stored, e.g., whether it is a simple word document or a movie file. Other software interprets the data and uses the file system to store and retrieve data. In other words, file systems provide mechanisms to manage data. Accordingly, VMemFS provides the storage mechanisms to store a virtual machine's data (such as virtual device state); in some cases, e.g., guest memory, VMemFS only store pframes, or data structures to manage the guest memory).

In computer system 100, it is the pre swap or post swap kernel that uses the VMemFS to store and retrieve the VM checkpoint data. In other words, if the VMemFS version didn't change, it can manage the data without any difficulty and if the VMemFS version changes, it should able to understand the previous format and still manage the data given to it by previous version. The VMemFS version may not change but virtual device state format or pframe format might be changed; in this case, the software components that understand these data read from the older-version VMemFS and provide for any translation required.

Figure 2:
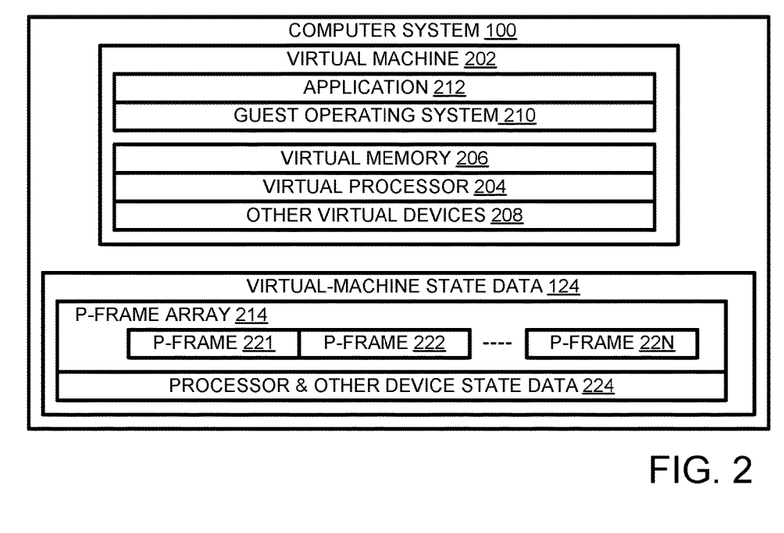
FIG. 2 is another schematic diagram of the computer system of FIG. 1, detailing a virtual machine and associated state data.

Another view of computer system 100 is presented in FIG. 2. From a virtual hardware perspective, a virtual machine 202 of virtual machines 102 (FIG. 1) includes a virtual processor 204, virtual memory 206, and other virtual devices 208. This virtual hardware hosts a guest operating system 210, which, in turn, hosts an application, 212. State data 124 includes a p-frame array 214. p-frame array 214 includes a series of p-frames 221, 222 . . . 22N, where N is the number of pages assigned to virtual machine 202. In addition, state data 124 includes state data for virtual processor 204 and other virtual devices 206.

Virtual memory 206 includes guest memory, which includes guest page table pages. Thus, when guest memory is captured during a suspend operation, the guest virtual-address to guest physical address data is captured. Processor 102 needs to convert virtual addresses to machine addresses. Guest OS 210 maintains virtual address to physical address mappings, while hypervisor kernel 120 maintains the physical address to machine address mapping. Processor 102 combines both mappings. Hypervisor kernel 120 has multiple data structures that help in converting physical addresses to machine addresses. P-frames of array 124 have the full mapping information, while other data structures are caches of p-frames. P-frame array 124 Is stored in VMemFS 122 along with the virtual-device state.

Figure 3:
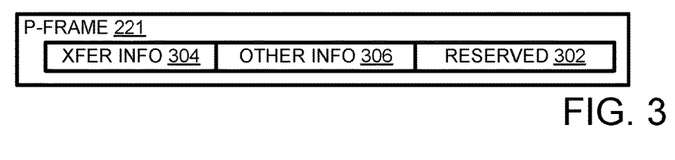
FIG. 3 is a detail of a p-frame of the state data of FIG. 2.

The page states represented in a p-frame, e.g., p-frame 221 in FIG. 3 can vary between VMemFS versions. P-frame 221 can have 64 bits that can be divided into (not-necessarily contiguous) groups of bit positions. One "reserved" group 302 is constituted by bit positions that have no meaning in a version of the VMemFS, but that are available to accommodate new states that may become important in a future version. Another group 304 includes bits that have transfer information relevant to a hypervisor swap. A third group 306 includes bits that are not relevant to a hypervisor swap but are useful at other times, e.g., during normal operation.

For example, the swap-relevant group 304 can have bits dedicated to indicating whether or not a page is present in machine memory or whether or not it is "dirty" (as a modification that has not been written back to a copy of the hard disk). However, other possible states may be transitory transitional states that may not be possible when a virtual-machine is suspended. For example, during normal operation, a virtual-memory page can be in the process of being swapped into or out of machine memory. A p-frame format could indicate states as follows: 000=not present, 001=being swapped in, 011=present & clean, 100=present and dirty, 101=being written back.

However, the transitions can be allowed to complete before a suspend operation is consummated. In that case, the new hypervisor does not need to check for these transition states upon launch. Therefore, these transition states would be represented in "other info" group 306. For example, a "XFER info" group 304 of bits having transfer information relevant to a hypervisor swap can include two bits: 00=not present, 01=present & clean, 10=present & dirty; then other info 306 can include one bit: 0=transferring in, 1=writing back. Another example for "other info" 306 is pin count, the number of components pinning this mapping. When a component is pinning a mapping, the hyper-visor is not allowed to swap out or remap. However, at the suspend time this count is necessarily zero, so it is not necessary to transfer it to the other hypervisor.

In computer system 100, the old and the new hypervisors support virtual machines. However, the present invention applies to other types of hypervisors as well, e.g., hypervisors that support process containers that serve as virtual application environments (as opposed to virtual machines, which serve as virtual operating-system environments). Herein, a "hypervisor" is a virtualizing operating system. At a minimum, the hypervisors of interest herein virtualize main (machine) memory to provide for virtual memory.

Some hypervisors provide for virtual machines, process containers, and/or other virtual-computing environments.

In computer system 100, the invention is applied to suspending and resuming virtual machines. In other embodiments, e.g., relating to containers, processes other than virtual machines can be suspended and resumed to allow a live-swap of an underlying hypervisor. These embodiments store data structures used to manage virtual memory in a VMemFS much the way computer system 100 uses a VMemFS to store p-frames and other structures during a hypervisor swap.

Figure 4:
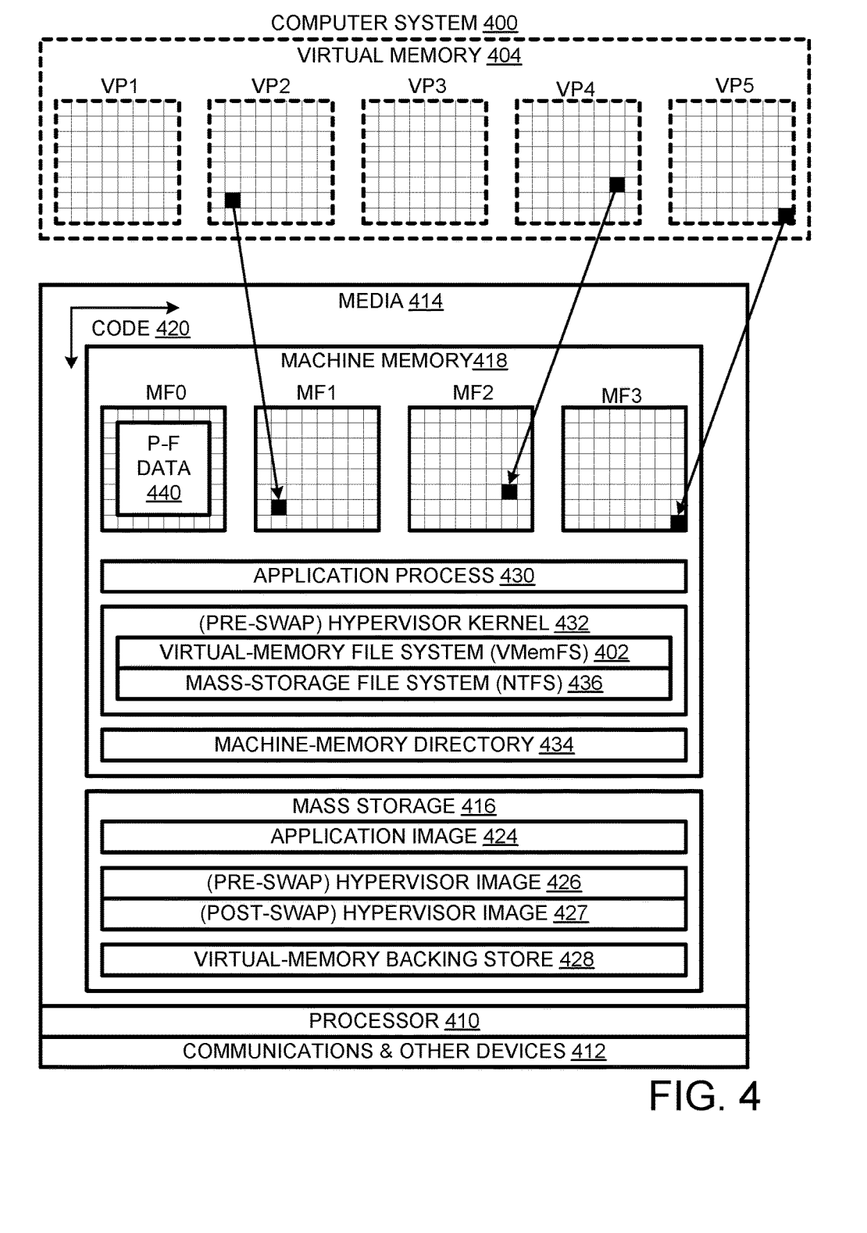
FIG. 4 is a schematic diagram of a computer system having a hypervisor with a virtual-memory file system.

For example, a computer system 400, shown in FIG. 4, provides a virtual-memory file system (VMemFS) 402 that is used to store data structures employed to manage virtual memory 404. Computer system 400 includes hardware: a processor 410, communications and other devices 412, and non-transitory media 414. Media 414 includes mass storage 416 and random-access machine memory 418. Media 414 is encoded with code 420 defining, in mass storage 416, an application image 424, a "pre-swap" hypervisor image 426, a "post-swap" hypervisor image 427, and a virtual-memory backing store 428. Virtual-memory backing store 428 is typically used for systems in which virtual memory space is too large to fit in machine memory all at once. In systems for which the machine memory space is large enough to accommodate all of virtual memory, a virtual-memory backing store may not be required.

Code 420 further defines, in machine memory 418, an application process 430 associated with application image 424, a hypervisor kernel 432 associated with hypervisor image 426, and a machine memory directory 434. Hypervisor kernel 432 includes a mass-storage file system 436 (e.g., NTFS) for storing information to and retrieving information from mass storage 418. Hypervisor kernel 432 also includes VMemFS 402. As with NTFS, VMemFS is for storing information to and retrieving from main memory; the information can be the data structures to manage virtual memory or for transferring VM state during the upgrade process from the pre-swap kernel to post swap kernel.

Using VMemFS 402 to store mappings, kernel 432 assigns pages VP1-VP5 of virtual memory 404 to computing processes (associated with kernel 432 and/or application 430). The processes issue read and write commands to addresses in the virtual pages assigned to them. The pages, in turn, can be assigned to respective machine-memory frames MF1-MF3 to provide for physical storage of virtual page data. For example, if page VP2 is assigned to frame MF1, then, when a process addresses a location within page VP2, in reality, it accesses the corresponding location within frame MF1. Kernel 432 tracks the assignments of pages to frames as page-frame (aka, p-frame or p-f) data 440, which is stored in a region MF0 of machine memory.

Figure 5:
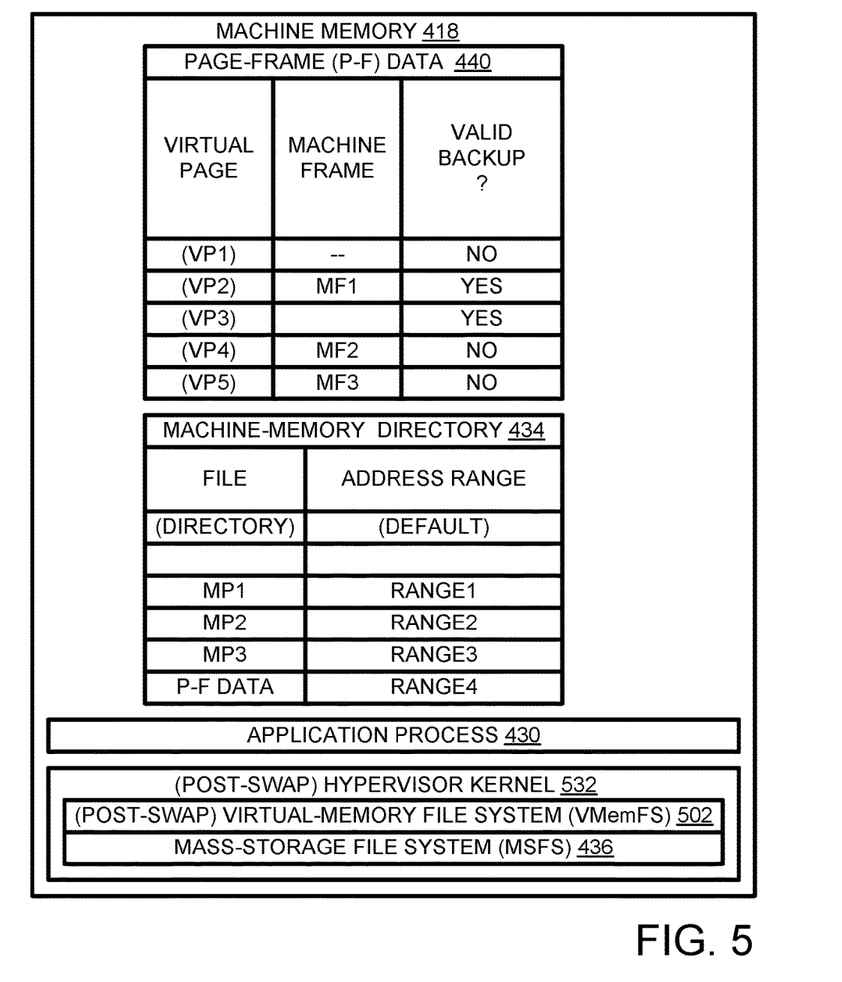
FIG. 5 is a schematic diagram of main memory of the computer system of FIG. 4.

Page-frame data 440 is presented in greater detail in FIG. 5. For each virtual-page, page-frame data 440 indicates whether or not it is assigned to a machine frame and, if so, the frame to which it is assigned. In addition, page-frame data 440 indicates for each page, whether there is a valid representation of it in mass storage. For example, page VP4 is assigned to machine frame MF2, and there is no valid backup in mass storage. This can occur because data in page VP4 and, thus, in frame MF2, has been modified, and the modification has not been written back to backing store 428. As is commonly the case, the number of virtual pages (5) in FIG. 4, exceeds the number of machine frames (3) to which the pages can be assigned. When a process requests access to a page not assigned to a machine frame, a valid representation of the requested page can be swapped from mass storage to a frame that has been occupied by a virtual page for which there is a valid representation in mass storage. Note that the page numbers are presented in parentheses in FIG. 5 because they can be implicit in the order of the page-frames and, therefore, need not be specified explicitly.

Also presented in greater detail in FIG. 5, machine-memory directory 434 identifies locations, e.g., as address ranges, of itself, frames, and page-frame data. The directory is stored in a default location or a pointer at a default location identifies the location of the directory. Alternatively, the directory can be constituted by a set of pointers that implicitly identify program objects based on the code that accesses the locations pointed to.

Hypervisor kernel 432 is designed to protect (or, at least, not corrupt) the locations of the directory, frames, and page-frame data from initialization and overwriting during booting of a hypervisor. Once a hypervisor is booted, it can use directory 434 to access the page-frame data and the machine frames so as to manage virtual memory. Where the booted hypervisor is different from the hypervisor that managed the virtual memory before the boot, a transfer of control of virtual memory will have been effected without having to save memory contents to mass storage and without moving the bulk of memory contents to a new location. Thus, hypervisor swaps can be effected with minimal interruption to processes that access virtual memory.

In summary, the VMemFS empowers a host hypervisor to access data objects and interpret the information contained therein. For example, file system VMemFS determines which bits in the page-frame data are used to identify a machine frame and which bits are used to indicate whether or not a valid backup is available. Just as NTFS allows one computer to retrieve information stored on a hard disk by another computer, VMemFS allows one hypervisor to retrieve virtual memory contents and mappings written by another hypervisor. In other words, VMemFS allows one hypervisor to retrieve "information about virtual memory or pframes (mappings from guest physical address to machine memory) written by another hypervisor.

Figure 6:
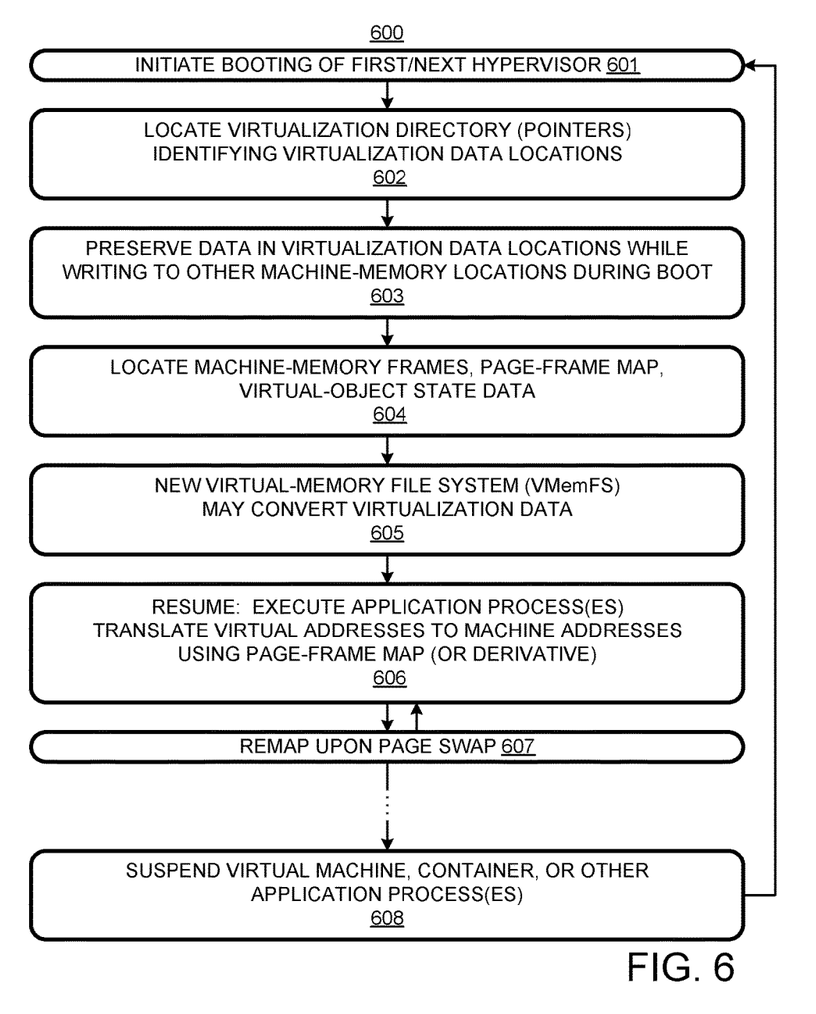
FIG. 6 is a flow chart of a hypervisor-swap process that can be implemented using the computer systems of FIG. 1, FIG. 4, and other systems.

A hypervisor swap process 600, guided by a VMemFS, is flow-charted in FIG. 6. At 601, a hypervisor boot is initiated. In some scenarios, a prior hypervisor initiates the boot as part of a procedure to replace itself with an updated or other different version of the hypervisor. At 602, during the boot operation, the hypervisor (e.g., its boot loader) locates a virtualization directory identifying locations of virtualization data in machine memory. The virtualization directory is a data object the structure and location of which is determined by the VMemFS. That structure can be a directory tree, a table of contents, or a set of pointers as in computer system 100 of FIG. 1.

From the perspective of the boot loader, these locations are not to be overwritten during the boot process, at least not prior to a time when the included data is consumed. However, the boot process does overwrite other locations within machine memory. For example, kernel components can be loaded into machine memory locations not otherwise occupied by virtualization data. Thus, at 603, locations identified by the virtualization data as locations that might store virtualization data are not overwritten during booting, while other locations of machine memory are overwritten. The pages that need to be protected can be derived from the data that is stored in VMemFS.

At 604, the hypervisor locates machine-memory frames to be used for storing physical representations of virtual-memory contents, and one or more page-frame maps. The page-frame maps may allow page lookups to determine associated frames or frame lookups to determine associated pages. Also, the maps can include page or frame state data, such as whether a page is present (represented) in machine memory or whether a frame is "dirty", e.g., includes modifications that have not been written back to a disk version of the associated frame: if so, the page and frame are "dirty"; if there are no modifications that have not been written back to disk, then the page and frame are "clean".

Some hypervisors can support multiple virtual-computing environments, e.g., virtual machines and/or process containers. In such cases, each virtual-computing environment can have its own page-frame map. Thus, there may be multiple page-frame maps that must be preserved during boot and used during normal operation for translating virtual addresses to machine addresses.

The page-frame-map states can be represented in the page-frame map(s). The VMemFS determines which states are represented and how each state is represented in the memory map. Even when a hypervisor is updated to a new version, the VMemFS version may remain the same. In that case, and even in some cases where the VMemFS version is changed, the map data can be used as-is. However, in some cases, a new VMemFS version of a new hypervisor may require a format change for page-frame maps and/or other virtualization data written by a prior version of the VMemFS. In such a case, the more advanced version of the VMemFS is responsible for any required conversion. In such cases, at 605, the new (more advanced) file system may convert the virtualization data for its own use. In an update, the more advanced version can perform the conversion during or after boot. In a rollback operation, the more advanced version can perform the conversion in connection with a suspend operation to be followed by a boot of a hypervisor with a prior VMemFS version.

At 606, normal operation may be resumed. As an application or applications are executing and issuing read/write accesses of virtual memory, the hypervisor translates the virtual (page) addresses to machine (frame) addresses using the page-frame map or a derivative thereof. Typically, the page-frame map is used to generate a page table for a processor so that the translation can be performed faster in hardware. The page table is thus a derivative of the page-frame map. The page table may be derived from a page-frame map derived by a new VMemFS from a page-frame map prepared by a previous version of the VMemFS. If at 605, a hypervisor with a new version of a VMemFS converts the stored VMemFS, then the page-frame map may be converted, and the converted map may be considered a derivative of the page-frame map in place when booting was initiated.

When a page address is called for which there is no counterpart in machine memory, the result may be that a page represented in mass storage is copied from mass storage to a frame in machine memory, often overwriting contents of a page previously represented by that frame. This change can be reflected by updating the page-frame map at 607.

At 608, virtual machines, containers, and/or other application processes are suspended so that page-frame mappings are fixed. Suspension can occur for many reasons including preparation for a hypervisor hot-swap. If the VMemFS is relied upon during normal operation and during the hot swap, then the suspension can be straightforward. If the VMemFS is only established and used during the hot-swap, the establishment can be at or near the time of the suspend. Preferably, the VMemFS is used during normal operation to avoid this additional step.

An additional step may also be required to convert between state data formats if different versions of the VMemFS are involved. In an update operation, a new VMemFS may convert after reboot on an as-needed basis, so the conversion step does not delay the resume and the impact of the update may still not be experienced by a user. However, in a rollback operation to an older VMemFS, the conversion may have to be performed before resumption, which is likely to delay the resume relative to the suspend. After the suspend, process 600 can return to action 601 to reboot the same or a different hypervisor.

In general, the time required for a hypervisor swap can be quite fast. The suspend operation can be essentially instantaneous since most of the information required can have been pre-stored in the VMemFS. There are cases where some time is required for format changes upon resume. However, the format changes or other modifications can be delayed until the relevant information is required. In other words, it is not necessary to perform all format changes and modifications before operation is resumed. Thus, the "interruption" between suspend and resume can be on the order of a second or less.

A conceptual distinction may be drawn between embodiments that employ the same VMemFS during normal operation and during hypervisor swaps, and embodiments that call a VMemFS for the purpose of a hypervisor swap, but rely on a different VMemFS for normal operation. However, as a practical matter, greater consistency in the way information is stored and retrieved during normal vs. transfer operation can reduce interruption of a hosted application during a hypervisor swap. For example, consistency between page-frame map formats can reduce or eliminate a requirement to reformat p-frames at the time of suspension in anticipation of a hypervisor swap. For this reason, in the preferred conceptualization, there is one VMemFS with both a normal mode and a transfer mode, with embodiments differing in how similar or distinct these modes are.

Herein, "VMemFS" stands for "virtual-memory file system" and denotes a standardized protocol for storing data in and retrieving data from physical machine memory that includes mappings between physical and virtual addresses. Although standardized, a VMemFS allows extensions and modifications as long as backward compatibility is maintained. Statements to the effect that a hypervisor or a hypervisor kernel "has" or "includes" a VMemFS indicate that the hypervisor or hypervisor kernel includes code required to implement the standardized protocol. Statements to the effect that an agent (e.g., a hypervisor kernel) stored data "in" a VMemFS refer to storing data in a data structure created in conformance with the protocol.

Herein, a "directory" is any data structure used to determine what can be found where. For example, a directory can be a directory tree (as was used in MSDOS, distributed by Microsoft Corp.), a table of contents, or a set of pointers. Herein, a pointer is data identifying a memory address or a range of memory addresses.

Herein, art labeled "prior art", if any, is admitted prior art; art not labeled "prior art" is not admitted prior art. The foregoing embodiments and modifications to and variations upon those embodiments are provided for by the present invention, the scope of which is defined by the following claims.

What is claimed is:
1. A process comprising:
  initiating a boot of a first hypervisor on a computer system having machine memory;

modifying and preserving, respectively by the first hypervisor during booting, contents of a first portion of the machine memory and contents of a second portion of the machine memory;

locating, by the first hypervisor using a first virtual-memory file system of the first hypervisor, in the second portion of the machine memory, frames of the machine memory and a mapping between pages and frames; and after booting is complete, executing, by the first hypervisor, of application processes, the executing including translating addresses of locations within pages of virtual memory to addresses of corresponding locations within the frames of machine memory.

2. The process of claim 1 wherein the executing includes resuming at least a first virtual machine.

3. The process of claim 2 further comprising, before the initiating, suspending the first virtual machine, the preserving maintaining memory contents of the virtual machine between its suspension and its resumption.

4. The process of claim 2 wherein the locating is also of a mapping of pages to virtual machines.

5. The process of claim 2 further comprising updating, using the first virtual-memory file system, the mapping between pages and frames when a page is newly assigned to a frame.

6. The process of claim 5 wherein the locating involves using pointers to locate the frames and the mapping.

7. The process of claim 6 further comprising:
suspending, by the first hypervisor, a second virtual machine;
initiating, by the first hypervisor, a boot of a second hypervisor on the computer system, the second virtual machine being either the same as the first virtual machine or different from the first virtual machine;
modifying and preserving, respectively by the second hypervisor during its booting, contents of the first portion of the machine memory and contents of the second portion of the main memory;
locating, by the second hypervisor using a second virtual-machine file system of the second hypervisor, frames of the machine memory and a mapping between pages and frames; and
after booting is complete, resuming, by the second hypervisor, the second virtual machine.

8. The process of claim 7 wherein the first virtual-memory file system separates, in the mapping, information required for resuming processes from information not required for resuming processes.

9. The process of claim 7 wherein the first and second hypervisors are different versions of the same hypervisor, and the first and second virtual-memory file systems are instances of the same version of the virtual-memory file system.

10. The process of claim 7 wherein one of the first and second virtual-memory file systems is a more advanced version and the other of the first and the second virtual-memory file systems is a less advanced version, the more advanced version converting the mapping between a format conforming to the more advanced version and a format conforming to the less advanced version in connection with suspending the application processes or in preparation for resuming the application processes.

11. A system comprising non-transitory media encoded with code that, when executed by a processor, implements the process of claim 1.

12. A system comprising non-transitory media encoded with code that, when executed by a processor, defines a first hypervisor for hosting an application process that addresses virtual memory and for translating the virtual-memory page addresses to machine-memory frame addresses, the hypervisor tracking assignments of pages to frames using a first instance of a virtual-memory file system so that another hypervisor incorporating a second instance of the same virtual-memory file system can resume the application process after it is suspended by the first hypervisor using the mapping maintained using the first instance of the virtual-memory file system.

13. A system as recited in claim 12 wherein the application process is a virtual machine process.

14. The system of claim 12 wherein the first virtual-memory file system separates information required for resuming the virtual-machine process from information not required for resuming the virtual-machine process.

15. A system comprising non-transitory media encoded with code that, when executed by a processor, implements a process including:
initiating a boot of a first hypervisor on a computer system having machine memory;
modifying and preserving, respectively by the first hypervisor during booting, contents of a first portion of the machine memory and contents of a second portion of the machine memory;
locating, by the first hypervisor using a first virtual-memory file system of the first hypervisor, in the second portion of the machine memory, frames of the machine memory and a mapping between pages and frames; and
after booting is complete, executing, by the first hypervisor, of application processes, the executing including translating addresses of locations within pages of virtual memory to addresses of corresponding locations within the frames of machine memory.

16. The system of claim 15 wherein the executing includes resuming at least a first virtual machine.

17. The system of claim 16 further comprising, before the initiating, suspending the first virtual machine, the preserving maintaining memory contents of the virtual machine between its suspension and its resumption.

18. The system of claim 16 wherein the locating is also of a mapping of pages to virtual machines.

19. The system of claim 16 wherein the process further includes updating, using the first virtual-memory file system, the mapping between pages and frames when a page is newly assigned to a frame.

20. The system of claim 19 wherein the locating involves using pointers to locate the frames and the mapping.

21. The process of claim 20 wherein the process further includes:
suspending, by the first hypervisor, a second virtual machine;
initiating, by the first hypervisor, a boot of a second hypervisor on the computer system, the second virtual machine being either the same as the first virtual machine or different from the first virtual machine;
modifying and preserving, respectively by the second hypervisor during its booting, contents of the first portion of the machine memory and contents of the second portion of the main memory;
locating, by the second hypervisor using a second virtual-machine file system of the second hypervisor, frames of the machine memory and a mapping between pages and frames; and after booting is complete, resuming, by the second hypervisor, the second virtual machine.

22. The process of claim 21 wherein the first virtual-memory file system separates, in the mapping, information required for resuming processes from information not required for resuming processes.

23. The process of claim 21 wherein the first and second hypervisors are different versions of the same hypervisor, and the first and second virtual-memory file systems are instances of the same version of the virtual-memory file system.

24. The process of claim 21 wherein one of the first and second virtual-memory file systems is a more advanced version and the other of the first and the second virtual-memory file systems is a less advanced version, the more advanced version converting the mapping between a format conforming to the more advanced version and a format conforming to the less advanced version in connection with suspending the application processes or in preparation for resuming the application processes.

\* \* \* \* \*